US008087889B2

(12) United States Patent
Meldgaard et al.

(10) Patent No.: US 8,087,889 B2
(45) Date of Patent: Jan. 3, 2012

(54) WIND TURBINE BLADE WITH DEFLECTABLE FLAPS

(75) Inventors: Christian Meldgaard, Røncle (DK); Michael Friedrich, Sickeborg (DK)

(73) Assignee: Gamesa Innovation & Technology, S.L., Sarriguren (Navarra) (ES)

( * ) Notice: Subject to any disclaimer, the term of this patent is extended or adjusted under 35 U.S.C. 154(b) by 821 days.

(21) Appl. No.: 12/214,074

(22) Filed: Jun. 16, 2008

(65) Prior Publication Data

US 2009/0028705 A1 Jan. 29, 2009

(30) Foreign Application Priority Data

Jun. 22, 2007 (ES) .................................. 200701738

(51) Int. Cl.
*B64C 27/615* (2006.01)

(52) U.S. Cl. ........................................... 416/24; 416/41

(58) Field of Classification Search ............. 416/23–25, 416/40–41, 233 R, 240
See application file for complete search history.

(56) References Cited

U.S. PATENT DOCUMENTS 5,375,324 A * 12/1994 Wallace et al. ............ 29/889.21
6,015,115 A * 1/2000 Dorsett et al. ................ 244/219
6,199,796 B1 * 3/2001 Reinhard et al. ............ 244/35 R
6,347,769 B1 * 2/2002 To et al. ........................ 244/219
6,644,919 B2 * 11/2003 Bauer et al. ..................... 416/23
2007/0003403 A1 * 1/2007 Pedersen et al. ............... 415/4.1
2008/0292461 A1 * 11/2008 Stiesdal ........................ 416/147

FOREIGN PATENT DOCUMENTS

WO WO 2007045940 A1 * 4/2007

* cited by examiner

*Primary Examiner* — Matthew W Such
(74) *Attorney, Agent, or Firm* — Ladas & Parry LLP

(57) ABSTRACT

A wind turbine having at least a blade comprising a first component having an aerodynamic profile with a leading edge, a trailing edge, and suction and pressure sides between the leading edge and the trailing edge, and a second component, attached to the trailing edge and/or to the leading edge of the first component in at least a part of the blade. An upwards and/or downwards deflectable flap allows changing the flow over the blade, in which the unit for deflecting the flap is a fluid inflatable unit placed in a flap inner chamber close to the first component and in which the wind turbine comprises a unit for controlling the inflatable unit depending on the wind situation and/or the blade loads.

10 Claims, 2 Drawing Sheets

WIND TURBINE BLADE WITH DEFLECTABLE FLAPS

FIELD OF THE INVENTION

The invention relates to a wind turbine having rotor blades with deflectable flaps and in particular to rotor blades with deflectable flaps for optimizing the blade loads.

BACKGROUND

Wind turbines are devices that convert mechanical energy to electrical energy. A typical wind turbine includes a nacelle mounted on a tower housing a drive train for transmitting the rotation of a rotor to an electric generator.

The efficiency of a wind turbine depends on many factors. One of them is the orientation of the rotor blades with respect to the direction of the air stream, which is usually controlled by a pitch system that allows adjusting the pitch angle of the rotor blades for maintaining the rotor's speed at a constant value or within a given range. Otherwise, specially at high wind speeds, the load of the rotor will exceed the limits set by the wind turbine's structural strength.

There are two basic methods for controlling the power of a wind turbine changing the pitch angle of the rotor blades: the "pitch" control method and the "stall" control method.

In the "pitch" control method the rotor blade's pitch angle is changed to a smaller angle of attack in order to reduce power capture and to a greater angle of attack to increase the power capture. This method allows a sensitive and stable control of the aerodynamic power capture and rotor speed.

In the "stall" control method the rotor blade's pitch angle is changed to a greater angle of attack to the point where the flow separates at the rotor blade's surface, thus limiting the aerodynamic power capture.

The pitch regulated wind turbines can also use the pitch system to reduce the dynamic loads, either by cyclic pitch or by individual blade pitch. However, for large wind turbine blades it can be difficult to control the blade loading as the blade loading can vary over the blade length. As the rotor size is increasing, the pitching of the blades not necessarily provides an optimized loading along the whole blade because nor only wind shear, yaw errors and gust will affect the flow on the blade, but different gusts can hit the blade simultaneously or complex wind shear profiles with negative wind shear can occur.

In addition to the use of the pitch system there are known in the prior art some proposals in the prior art for optimizing the blade loads.

One known proposal is the use of small control surfaces such as Gurney flaps attached to the trailing edge for optimizing the blade loads. One disadvantage of Gurney flaps is the increase in aerodynamic noise from the free ends of the Gurney flaps and from the gaps in the blade where the Gurney flaps are positioned.

Another known proposals are addressed to control the aerodynamic forces along the rotor blades by a continuous variation of the airfoil geometry in is the leading edge region and trailing edge region along part of or along the whole blade span.

One of these proposals, disclosed in WO 2004/088130, relates to a design concept by which the power, loads and/or stability of a wind turbine may be controlled by a fast variation of the geometry of the blades using active geometry control (e.g. smart materials or by embedded mechanical actuators), or using passive geometry control (e.g. changes arising from loading and/or deformation of the blade) or by a combination of the two methods. In one preferred embodiment piezoelectric plates are to built in the trailing edge over part of the blade for modifying its geometry in order to reduce the blade loads. One disadvantage of the piezoelectric plates are the electrical cables that are necessary to bring power to them. These cables are woundable to electrical lightning and can easily be damaged in case of a lightning strike.

Another proposal, disclosed in U.S. Pat. No. 6,769,873, relates to a dynamically reconfigurable wind turbine blade assembly including a plurality of reconfigurable blades mounted on a hub, an actuator fixed to each of the blades and adapted to effect the reconfiguration thereof, and an actuator power regulator for regulating electrical power supplied to the actuators.

None of these proposals produces fully satisfactory results, therefore a continuing need exists for wind turbines having rotor blades with means for reducing the blade loads.

SUMMARY OF THE INVENTION

An object of the invention is to provide a wind turbine that, in addition to a pitch system, has special means for achieving an accurate control of the blade loads.

Another object of the invention is to provide a wind turbine having means for controlling the changes in the flow and hence optimizing the whole rotor performance and minimizing the pitch activity of the blades.

These and other objects of the present invention are met by providing a wind turbine with rotor blades comprising a first component having an aerodynamic profile with a leading edge, a trailing edge and suction and pressure sides between the leading edge and the trailing edge and a second component, attached to the trailing edge and/or to the leading edge of the first component in at least a part of the blade, which comprises an upwards and/or downwards deflectable flap by means of fluid inflatable means placed in a flap inner chamber close to the first component that allows changing the flow over the blade, and means for controlling the deflection of said flap for optimizing the blade loads depending on the wind situation and/or the blade loads.

The flap deflection is controlled by load measurements on the blade, velocity or pressure measurements of the air on the blade or lidar measurements of the flow in front of the blade. With the load feed back and the appropriate control algorithm the flap can be used to control the blade loading more accurate than in the prior art.

In a preferred embodiment said fluid inflatable means is a flexible tube extending along the flap spanwise direction which is arranged inside a chamber placed in a suitable position for deflecting the flap in the desired direction, i.e. in an upper position for deflecting the flap downwards and in an lower position for deflecting the flap upwards. Hereby a deflectable flap in one direction (upwards or downwards) it is achieved.

In another preferred embodiment said fluid inflatable means are two flexible tubes extending along the flap spanwise direction and arranged inside a chambers placed in suitable position for deflecting the flap in both directions. Hereby a deflectable flap in both directions (upwards and downwards) it is achieved.

In another preferred embodiment the second component also includes a lower and/or upper fairing plate for preventing air gaps when the flap is deflected. Hereby an aerodynamically optimized deflectable flap is achieved.

In all embodiments the flap can be made in one piece of a flexible material, such as rubber or pultruded fiberglass.

Other features and advantages of the present invention will be understood from the following detailed description in relation with the enclosed drawings.

DETAILED DESCRIPTION OF PREFERRED EMBODIMENTS

Figure 1A:
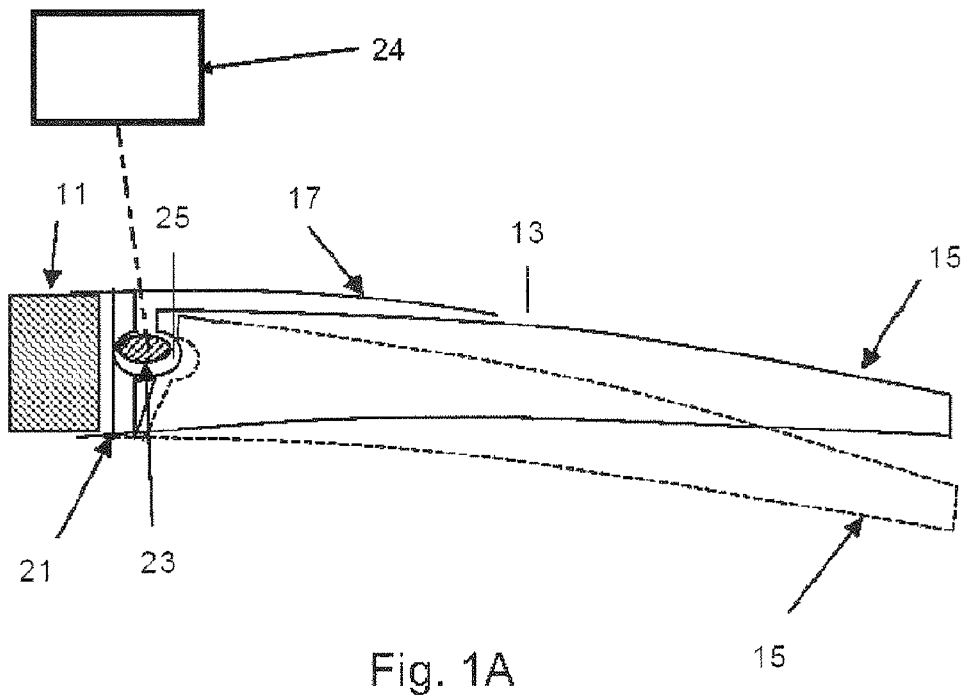
FIG. 1A is a schematic partial cross sectional view of a wind turbine blade according to the present invention showing a deflectable flap attached to the trailing edge of the blade and means for controlling its deflection.

FIG. 1A shows the second component 13 attached to the first component 11 of a wind turbine blade according to a first embodiment of the present invention.

The first component 11 has a typical aerodynamic profile with a leading edge 5, a trailing edge 7 and suction and pressure sides between the leading edge 5 and the trailing edge 7.

The following detailed description will refer to an embodiment of the invention in which the second component 13 is attached to the trailing edge 7 of the first component 11. The invention also comprises an embodiment in which the second component 13 is similarly attached to the leading edge 5 of the first component 11.

In FIG. 1A it is only shown the end part of the trailing edge to which the second component 13 is attached.

The second component 13 includes a deflectable flap 15 and a fairing plate 17.

FIG. 1A illustrates a downwards deflection of flap 15 from a first position to a second position—in phantom lines—by means of the inflation of a rubber tube 23 located in an inner chamber 25 with air or any other suitable fluid. The fairing plate 17 covers the flap 15 avoiding any air gap during its deflection.

The flap 15 is made in one piece of a flexible material and it is attached to the first component 11 with glue, bolts or any other suitable means. The flexibility of the material and the location of the inner chamber 25, where the inflatable tube 23 is placed, allows that such attachment can behave as if the flap 15 were hinged to the first component 11 in a flexible hinge 21.

The flap 15 may be made integrating the tube 23 in a full rubber flap which will hence be one piece with everything integrated in.

Another preferred solution is to make the flap 15 and the fairing plate 17 as a pulltruded profile eg. in glass fiber reinforced composite material. The attachment to the first component 11 will be flexible due to the geometrical shape and the mechanical properties of the material and the rubber tube 23 can be hidden inside the flap 15 and hence protected for UV radiation, ice etc.

FIG. 1A shows the deflection of flap 15 from an first neutral position to a second downwards position but the invention also comprises a flap 15 configured for deflecting from a first upwards position to a second downwards position or vice versa. In this case the neutral position will require a certain pressure inside the tube 23.

Figure 1B:
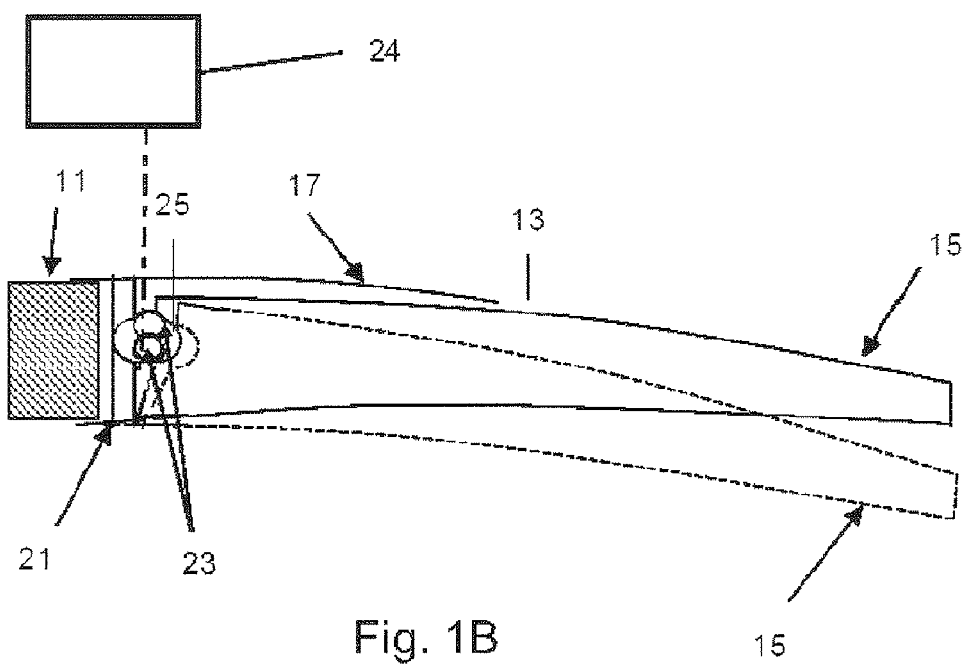
FIG. 1B is a schematic partial cross sectional view of a wind turbine blade according to another embodiment of the present invention.

In another variant of this embodiment (FIG. 1B), the flap 15 includes two inflatable tubes 23 for having a sort of double hinge system, one at the upper part and one on the lower part for a better control of direction of its deflection. The advantage of this solution is that in case of mal-function of the system, i.e. no pressure on the inflatable tubes, the flap 15 will be in neutral position and hence the wind turbine can operate as a normal pitch controlled wind turbine, until the system has been repaired.

Figure 2:
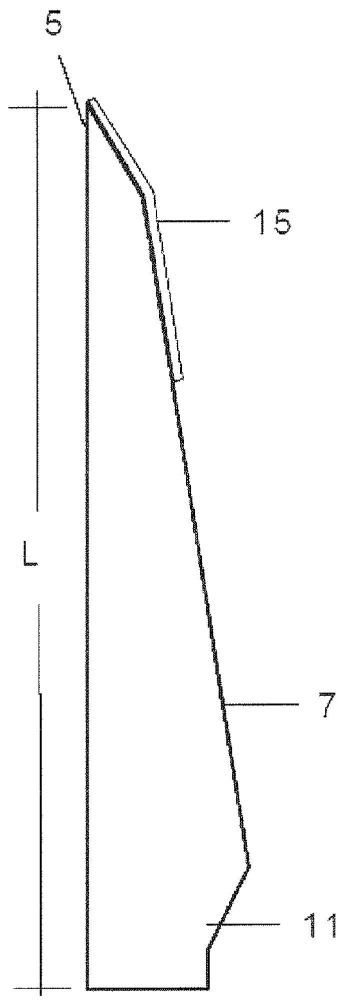
FIG. 2 is a schematic sectional view of a wind turbine blade incorporating a deflectable flap according to the present invention.
Figure 3:
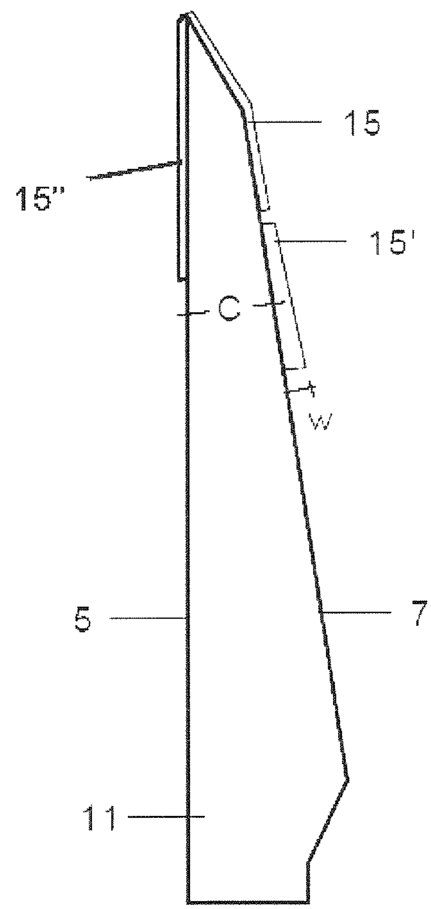
FIG. 3 is a schematic sectional view of a wind turbine blade incorporating two deflectable flaps according to the present invention.

The blade may include one individual flap 15 as shown in FIG. 2 or several flaps 15, 15' as shown in FIG. 3. In the latter case each flap 15, 15' has its own inflatable means 23.

In a preferred embodiment, the width W of the flap or flaps 15, 15' is comprised between 1-20% of the chord length C in the center of the flap.

The width W of the flap or flaps 15, 15' may be constant or variable. In the first case the width will be usually smaller close to the tip region and larger towards the root section of the blade. In the latter case, the width W of the flap 15', as shown in FIG. 3 will decrease towards the tip of the blade.

In another preferred embodiment, the flap or flaps 15, 15' are attached to the blade leading edge 5 and/or to the blade trailing edge 7 in a section having a length lesser than ⅓ of the blade length L.

If several flaps 15 are be mounted in sections of the blade, they will be designed in a manner that could be replaceable and could be mounted with few screws. The air/liquid connection could be a snap connection and hereby the modularity of this unit is high, and hence easy to change during maintenance. To avoid the split between the flap 15 and the trailing edge of the first component a rubber plate could be mounted between them and hereby avoiding air to flow in the air gap, which could generate whistle tones.

The wind turbine comprises computer means 24 for controlling the actuating means 23 that deflect the flap 15 taking into account load measurements on the blade and relevant airflow parameters provided by sensors.

Although the present invention has been fully described in connection with preferred embodiments, it is evident that modifications may be introduced within the scope thereof, not considering this as limited by these embodiments, but by the contents of the following claims.

The invention claimed is:

1. A wind turbine having at least a blade comprising a first component (11) having an aerodynamic profile with a leading edge, a trailing edge, and suction and pressure sides between the leading edge and the trailing edge, and a second component (13) attached to the trailing edge and/or to the leading edge of the first component (11) in at least a part of the blade, wherein:

the second component (13) comprises an upwards and/or downwards deflectable flap (15) that allows changing a flow over the blade;

the deflectable flaps (15) are deflected by fluid inflatable means (23) placed in a flap inner chamber (25) close to the first component (11);

the wind turbine comprises means (24) for controlling said fluid inflatable means (23) depending on a wind situation and/or the blade loads; and the fluid inflatable means are two flexible tubes (23) extending along, the flap (15) in a spanwise direction, one of the two flexible tubes being configured for deflecting the flap (15) upwards, and an other of the two flexible tubes for deflecting the flap (15) downwards.

2. A wind turbine according to claim 1, wherein the second component (13) also includes an upper fairing plate (17) for preventing air gaps when the flap (15) is deflected.

3. A wind turbine according to claim 1, wherein the flap (15) is made in one piece of a flexible material.

4. A wind turbine according to claim 3, wherein the flap (15) is made of rubber.

5. A wind turbine according to claim 3, wherein the flap (15) is made of pultruded fiber glass reinforced composite.

6. A wind turbine according to claim 1, wherein a width W of the flap (15) is comprised between 1-20% of a chord length C of the blade in a center of the flap (15).

7. A wind turbine according to claim 6, wherein the width W of the flap (15) is constant along the blade.

8. A wind turbine according to claim 6, wherein the width W of the flap (15') is variable along the blade.

9. A wind turbine according to claim 1, wherein the flap (15) is attached to the leading edge (5) of the blade and/or to the trailing edge (7) of the blade in a section having a length less than ⅓ of a length of the blade L.

10. A wind turbine according to claim 1, that wherein the blade includes one or several second components (13) having an individual flap (15, 15') with individual inflatable means (23).

* * * * *